(12) United States Patent
Wasserblat et al.

(10) Patent No.: US 8,914,285 B2
(45) Date of Patent: Dec. 16, 2014

(54) PREDICTING A SALES SUCCESS PROBABILITY SCORE FROM A DISTANCE VECTOR BETWEEN SPEECH OF A CUSTOMER AND SPEECH OF AN ORGANIZATION REPRESENTATIVE

(75) Inventors: Moshe Wasserblat, Makabim (IL); Dan Eylon, Ramat Hasharon (IL); Ezra Daya, Petah-Tikvah (IL); Tzach Ashkenazi, Tetach-Tikva (IL); Oren Pereg, Amikam (IL); Ohad Pollak, Zichron Yaacov (IL); Moshe Avlagon, Sde Yitchak (IL)

(73) Assignee: Nice-Systems Ltd, Ra'anana (IL)

(*) Notice: Subject to any disclaimer, the term of this patent is extended or adjusted under 35 U.S.C. 154(b) by 367 days.

(21) Appl. No.: 13/550,626

(22) Filed: Jul. 17, 2012

(65) Prior Publication Data
US 2014/0025376 A1    Jan. 23, 2014

(51) Int. Cl.
*G10L 15/10* (2006.01)
*G06Q 10/04* (2012.01)

(52) U.S. Cl.
USPC .......... 704/238; 704/251; 704/270; 705/7.31; 705/7.37

(58) Field of Classification Search
CPC .. G10L 15/10; G06Q 10/04; G06Q 10/06375; G06Q 30/0202
USPC ......... 704/232, 235, 236, 238, 251, 255, 270; 379/265.06, 265.07; 705/7.31, 7.37, 705/14.1
See application file for complete search history.

(56) References Cited

U.S. PATENT DOCUMENTS

| | | | | |
|---|---|---|---|---|
| 3,700,815 | A   * | 10/1972 | Doddington et al. | 704/246 |
| 4,292,471 | A   * | 9/1981  | Kuhn et al.       | 704/238 |
| 6,665,644 | B1 * | 12/2003 | Kanevsky et al.   | 704/275 |
| 7,363,222 | B2 * | 4/2008  | Josenhans         | 704/231 |
| 7,630,917 | B2 * | 12/2009 | Bangalore et al.  | 705/7.11 |
| 7,881,216 | B2 * | 2/2011  | Blair             | 370/252 |
| 7,937,301 | B2 * | 5/2011  | Bangalore et al.  | 705/30 |
| 7,945,473 | B2 * | 5/2011  | Fano et al.       | 705/14.1 |
| 8,175,989 | B1 * | 5/2012  | Gopinath et al.   | 706/45 |
| 8,566,256 | B2 * | 10/2013 | Hueter et al.     | 706/12 |
| 8,650,075 | B2 * | 2/2014  | Fano et al.       | 705/14.1 |
| 8,781,880 | B2 * | 7/2014  | Kocsor et al.     | 705/7.37 |
| 8,798,255 | B2 * | 8/2014  | Lubowich et al.   | 379/265.09 |
| 2001/0014868 | A1 * | 8/2001  | Herz et al.    | 705/14 |
| 2004/0148218 | A1 * | 7/2004  | Bovee et al.   | 705/10 |
| 2007/0071206 | A1 * | 3/2007  | Gainsboro et al. | 379/168 |
| 2007/0250404 | A1 * | 10/2007 | Bangalore et al. | 705/27 |
| 2008/0040110 | A1 * | 2/2008  | Pereg et al.   | 704/236 |
| 2008/0103761 | A1 * | 5/2008  | Printz et al.  | 704/9 |
| 2008/0310603 | A1 * | 12/2008 | Wu et al.      | 379/88.13 |
| 2011/0307257 | A1 * | 12/2011 | Pereg et al.   | 704/251 |
| 2013/0325560 | A1 * | 12/2013 | Kocsor et al.  | 705/7.37 |

\* cited by examiner

*Primary Examiner* — Martin Lerner
(74) *Attorney, Agent, or Firm* — Soroker-Agmon (57) ABSTRACT

A computerized method for sales optimization including receiving at a computer server a digital representation of a portion of an interaction between a customer and an organization representative, the portion of an interaction comprises a speech signal of the customer and a speech signal of the organization representative; analyzing the speech signal of the organization representative; analyzing the speech signal of the customer; determining a distance vector between the speech signal of the organization representative and the speech signal of the customer; and predicting a sale success probability score for the captured speech signal portion.

17 Claims, 7 Drawing Sheets

| [502] LVCSR words | how | are | you | feeling | today |
|---|---|---|---|---|---|
| [504] LVCSR Time tags [ms] | 600-660 | 890 – 940 | 1030 – 1100 | 1130 - 1190 | 1210-1300 |
| [506] Stemming | how | are | you | feel | today |
| [508] POS | Adv | Aux | Nn | V | Nn |

| [510] #Emotion event | 1 | 2 | 3 |
|---|---|---|---|
| [512] Emotion time tags [ms] | 30100 - 38500 | 64500 - 76000 | 98000 - 103000 |
| [514] Emotion Certainty | 85 | 55 | 80 |

| [522] Energy Level [dB] | -20 | -23 | -26 | -28 | -25 |
|---|---|---|---|---|---|
| [524] Pitch level [freq] | 115 | 118 | 113 | 109 | 104 |
| [526] Time tags [ms] | 600-700 | 700–800 | 800–900 | 900–1000 | 1000-1100 |

| [600] Feature | [602] Dist. value |
|---|---|
| [603] Energy standard deviation distance | [604] 0.23 |
| [605] Average pitch level distance | [606] 0.86 |
| [607] Median pitch level distance | [608] 0.83 |
| [609] Pitch standard deviation distance | [610] 0.23 |
| [611] Average speech rate distance | [612] 0.11 |
| [613] Speech rate standard deviation distance | [614] 0.06 |
| [615] Number of emotional events distance | [616] 0.04 |
| [617] Average level of emotional events distance | [618] 0.05 |
| [619] Distribution of words distance | [620] 0.18 |
| [621] Distribution of word n-grams distance | [622] 0.24 |
| [623] Average sentence length distance | [624] 0.47 |
| [625] Average adjective distribution distance | [626] 0.15 |

| [ 802 ] Class Label | [800] Time Frame [sec] |
|---|---|
| [ 834 ] " no sale attempt " | [804] 0 |
| [ 836 ] " no sale attempt " | [806] 4 |
| [ 838 ] " no sale attempt " | [808] 8 |
| [ 840 ] " no sale attempt " | [810] 12 |
| [ 842 ] " no sale attempt " | [812] 16 |
| [ 844 ] " no sale attempt " | [814] 20 |
| [ 846 ] " not sale " | [816] 24 |
| [ 848 ] " successful sale " | [818] 28 |
| [ 850 ] " successful sale " | [820] 32 |
| [ 852 ] " successful sale " | [822] 36 |
| [ 854 ] " successful sale " | [824] 40 |
| [ 856 ] " successful sale " | [826] 44 |

FIG. 8

Sale recommendation signal

FIG. 9

PREDICTING A SALES SUCCESS PROBABILITY SCORE FROM A DISTANCE VECTOR BETWEEN SPEECH OF A CUSTOMER AND SPEECH OF AN ORGANIZATION REPRESENTATIVE

BACKGROUND OF THE INVENTION

A major objective of business organizations that sell products or services is to increase their sales without increasing sales expenses. Increasing sales with limited increase of sales expenses is referred to herein as sales optimization.

Many of these organizations employ sales departments that include organization representatives. Those organization representatives conduct their sales efforts through vocal interactions with customers, users or other persons. Sales optimization may be achieved by increasing the ratio between the number of successful sales and the overall number of sale attempts. This ratio is referred to herein as successful sales ratio.

A key success factor for increasing the successful sales ratio is the estimation of the probability for a successful sale. Based on this estimation, organization representatives can decide whether to introduce a sale attempt.

Many systems provide sale success probability estimations based on customer relationship management (CRM) data or other data. Based on these estimations organization representatives can decide whether to introduce a sale attempt or not.

SUMMARY OF THE INVENTION

The probability for a successful sale may vary throughout the interaction; the variation is a function of the discourse dynamics between the parties during the interaction, thus different time intervals, across the interaction, hold different probabilities for a successful sale. Currently, the estimations of the probability for a successful sale throughout the interaction are heavily dependent on human training and experience.

There is a need in the art for a system and method for automatic real time estimation of the probability for a successful sale across the interaction in order to support organization representatives with sale introduction decision making.

An aspect of an embodiment of the disclosed subject matter, relates to a system and method for real time automatic prediction of the probability for a successful sale, based on the discourse dynamics between a customer and an organization representative across a vocal interaction. Vocal interactions may include telephone or voice over IP (VoIP) sessions, or the audio portion of a video or face-to-face interaction. An organization representative may be a trained sales representatives or other organization representative such as customer support representative.

A general purpose computer serves as a computer server executing an application for real time analysis of the interaction between the customer and the organization. The server receives the interaction portion by portion, whereas, each portion is received every predefined time interval. Each portion includes two audio streams, an audio stream of the customer side of the interaction and an audio stream of the organization representative side of the interaction. The general purpose computer extracts features from each audio stream and stores them in general purpose storage. The extracted features may include for example; speech rate, speech intonation, distribution of words, distribution or word n-grams of the customer and of the organization representative. Upon every newly received interaction portion, the server determines a distance vector between the stored features of the customer and of the stored features of the organization representative. The distance vector reflects the prosodic, syntactic and semantic closeness between the speech of the customer and the speech of the organization representative. This closeness level is an indication regarding the probability for a successful sale attempt.

The application uses the distance vector and applies the distance vector to a statistical model to determine a probability that a sale initiative of the organization representative, at the current point of the interaction, will be successful.

Next, the server determines a sale success projection score based on previous sale success prediction scores that were accumulated during the interaction. This prediction score predicts the probability for a successful sale during the next portion of the interaction. Next, the application makes a decision whether to output a sale recommendation signal or not. The decision may be based on the prediction score and/or speech recognition history and/or CRM data. The recommendation signal is helping organization representatives to decide if and when to introduce a sale offer to the customer.

By using this decision support system, organizations are focusing their sales effort thus achieving higher sale success rates without increasing sales expenses.

BRIEF DESCRIPTION OF THE DRAWINGS

The present disclosure will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
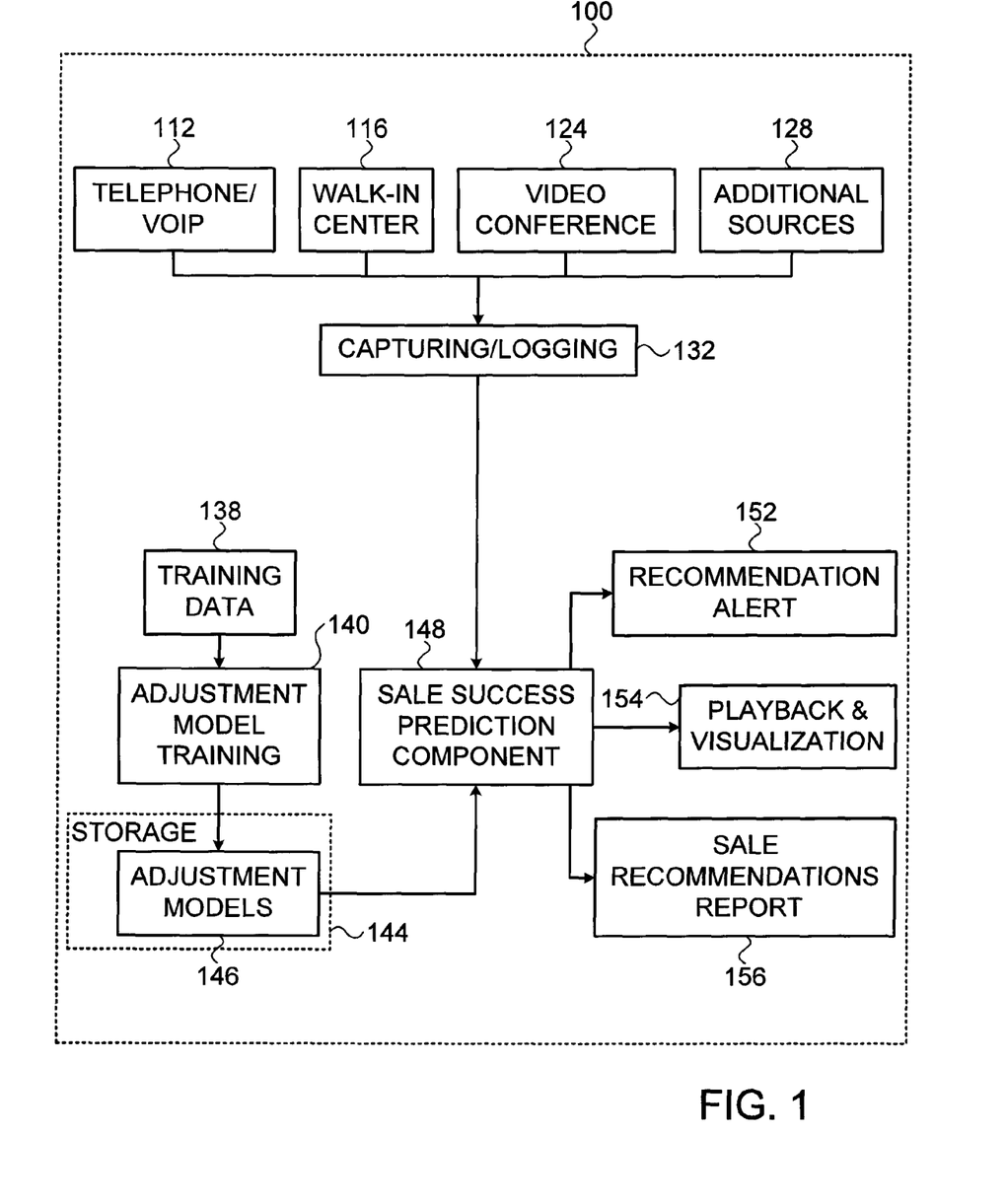
FIG. 1 is an exemplary block diagram of the main components in a typical environment in which the disclosed method is used.

Reference is made to FIG. 1 which shows an exemplary block diagram of components of a system 100 according to embodiments of the disclosed subject matter. As shown, a system 100 may include a capturing and/or logging module 132 that may receive input from various sources as shown by telephone/VoIP 112, walk-in center 116, video conference 124 or additional sources 128. It will be understood that capturing and logging module 132 may receive any digital input produced by any component or system, e.g., any recording or capturing device. For example, any one of a microphone, a computer telephony integration (CTI) system, a private branch exchange (PBX), a private automatic branch exchange (PABX) or the like may be used in order to capture audio signals. As further shown, the system may include a training data module 138, an adjustment model training component 140, a storage 144 that stores adjustment models 146. It also includes a sale success prediction component 148. As shown, the output of the system may be provided to recommendation alert module 152 and/or to playback and visualization module 154 and/or to sale recommendation report 156.

A typical environment where a system according to the invention may be deployed may be an interaction-rich organization, e.g., a call center, a bank, a trading floor, an insurance company or any applicable financial or other institute. Other environments may be a public safety contact center, an interception center of a law enforcement organization, a service provider, an internet content delivery company with multimedia search needs, a system for content delivery programs, or the like. Interactions captured and provided to system 100 may be any applicable interactions or transmissions, including broadcasts, interactions with customers or users or interactions involving organization members, suppliers or other parties.

Various data types may be provided as input to system 100. The information types optionally include auditory segments, video segments, textual interactions, and additional data. The capturing of voice interactions, or the vocal or auditory part of other interactions, such as video, may be of any form, format, and may be produced using various technologies, including trunk side, extension side, summed audio, separate audio, various encoding and decoding protocols such as G729, G726, G723.1, and the like. The interactions may be provided by modules 112, 116, 124 and 128 and captured by module 132. Vocal interactions may include telephone or voice over IP (VoIP) sessions, telephone calls of any kind that may be carried over landline, mobile, satellite phone or other technologies.

It will be appreciated that voice messages are optionally captured and processed as well, and that embodiments of the disclosed subject matter are not limited to two-sided conversations. Captured interactions may include face to-face interactions, such as those recorded in a walk-in-center, video conferences that include an audio component or any additional sources of data as shown by 128. Additional sources 128 may include vocal sources such as microphone, intercom, vocal input by external systems, broadcasts, files, streams, or any other source. Additional sources may also include non vocal sources such as e-mails, chat sessions, screen events sessions, facsimiles which may be processed by Object Character Recognition (OCR) systems, or others.

Data from all the above-mentioned sources and others may be captured and/or logged by capturing/logging module 132. Capturing/logging module 132 may include a set of double real-time buffers (RT-buffers). For example, a couple of RT-buffers may be assigned to each captured interaction or each channel. Typically, an RT-buffer stores data related to a certain amount of seconds, for example, an RT-buffer may store 4 seconds of real-time digitally recorded audio signal provided by one of modules 112, 116, 124 or 128.

The RT-buffer may be a dual audio stream, for example, a first audio stream may contain the representative side and a second audio stream may contain the customer side. RT-buffers may be used for real time analysis including real time sales optimization. In order to maintain low real time delay, RT-buffers are preferably sent for analysis within a short period, typically several milliseconds from their filling completion. The double buffer mechanism may be arranged in a way that enables the filling of the second buffer while the first buffer is being transferred for analysis by sale success prediction component 148. In some configurations, an RT-buffer may be allowed a predefined time for filling and may be provided when the predefined time lapses. Accordingly, an RT-buffer may be provided for processing every predefined period of time thus the real-time aspect may be maintained as no more than a predefined time interval is permitted between portions of data provided for processing by the system. For example, a delay of no more than 4 seconds may be achieved by allowing no more than 4 seconds of filling time for an RT-buffer. Accordingly, using two RT-buffers and counting time from zero, the first RT-buffer may be used for storing received audio signals during the first 4 seconds (0-4). In the subsequent 4 seconds (4-8), content in the first RT-buffer may be provided to a system while received audio signals are stored in the second RT-buffer. In the next 4 seconds (8-12) content in the second RT-buffer may be provided to a system while received audio signals are stored in the first RT-buffer and so on.

Capturing/logging module 132 may include a computing platform that may execute one or more computer applications, e.g., as detailed below. The captured data may optionally be stored in storage which is preferably a mass storage device, for example an optical storage device such as a CD, a DVD, or a laser disk; a magnetic storage device such as a tape, a hard disk, Storage Area Network (SAN), a Network Attached Storage (NAS), or others; a semiconductor storage device such as Flash device, memory stick, or the like.

The storage may be common or separate for different types of captured segments of an interaction and different types of additional data. The storage may be located onsite where the segments or some of them are captured, or in a remote location. The capturing or the storage components can serve one or more sites of a multi-site organization. Storage 144 may store adjustment models 146, distance measures between organization representative and customer speech features, sales optimization scores, sales optimization recommendations, or other data as detailed below and may be used in run-time for real time sales optimization.

In an embodiment, training data 138 may consist of a collection of pairs where each pair consists of a double sided audio interaction and its labeling vector. The labeling vector includes a class label for each time frame of the interaction. Class labels may be, for example "successful sale", "unsuccessful sale" and/or "no sale attempt".

Adjustment model training module 140 may use data in training data 138 in order to generate an adjustment model. The adjustment model may include any representation of distance between speech characteristics/features of the representatives and of the customers of a contact center or organization. An adjustment model generated for an organization may include any parameters that may be used for scoring each frame of an interaction in relation to the probability of a sale attempt success.

Input to sale success prediction component 148 may be an RT-buffer that may contain a recording of both sides of a call or interaction, e.g., the representative side and the customer side.

Sale success prediction component 148 may produce a sale success prediction score for each RT-buffer. It may issue a sale recommendation to the contact center representative based on the sale success prediction score produced for an RT-buffer. Before issuing a sale recommendation, component 148 may also take into consideration sale success prediction scores produced on previous RT-buffers. Component 148 may also use the speech recognition history of the customer, for example, emotional events related to previous calls of the customer and/or specific words/phrases detected on previous calls may affect the decision whether to issue a sale recommendation to the representative or not.

The sale success prediction component may also use CRM data such as: the customer's purchase history, the customer's demographic details and/or CRM sale recommendations, as part of the sale recommendation issuing decision.

The output of the sale success prediction component 148 and optionally additional data may preferably be sent to recommendation alert component 152. This module generates a sale recommendation alert based on the sale success prediction score and/or the speech recognition history of the customer and/or CRM data. The recommendation alert can be transferred to organization employees by popup application, email, SMS or any other communication way. The recommendation alert mechanism is configurable by the user. For example, the user can configure the predefined threshold that is used in the decision process of the sale recommendation generation.

The output of the sale success prediction component 148 may also be transferred to the playback & visualization component 154, if required. The sale recommendation signals and/or sale success prediction scores can also be presented in any way the user prefers, including for example various graphic representations, textual presentation, table presentation, vocal representation, or the like, and can be transferred in any required method. The output can also be presented as a dedicated user interface or media player that provides the ability to examine and listen to certain areas of the interactions, for example: areas of high sale success prediction scores or areas that include a sale recommendation signal.

The output of the sale success prediction component 148 is optionally transferred to the sale recommendations report component 156. This module generates an on demand or a timely report that includes a list of interactions along with their sale success prediction scores. The list is preferably sorted in a descending order from the highest score to the lowest. The sale success prediction score represent the probability that a sale attempt will be successful. Browsing through such report may be useful for sales representatives training. The report parameters such as the date and time interval, list size, maximum and/or minimum sale success prediction scores, etc. are configurable by the user.

System 100 may include one or more computing platforms, executing components for carrying out the disclosed steps. System 100 may be or may include a general purpose computer such as a personal computer, a mainframe computer, or any other type of computing platform that may be provisioned with a memory device (not shown), a CPU or microprocessor device, and several I/O ports (not shown).

System 100 may include one or more collections of computer instructions, such as libraries, executables, modules, or the like, programmed in any programming language such as C, C++, C#, Java or other programming languages, and/or developed under any development environment, such as .Net, J2EE or others.

Alternatively, methods described herein may be implemented as firmware ported for a specific processor such as digital signal processor (DSP) or microcontrollers, or may be implemented as hardware or configurable hardware such as field programmable gate array (FPGA) or application specific integrated circuit (ASIC). The software components may be executed on one platform or on multiple platforms wherein data may be transferred from one computing platform to another via a communication channel, such as the Internet, Intranet, Local area network (LAN), wide area network (WAN), or via a device such as CD-ROM, disk on key, portable disk or others.

Figure 2:
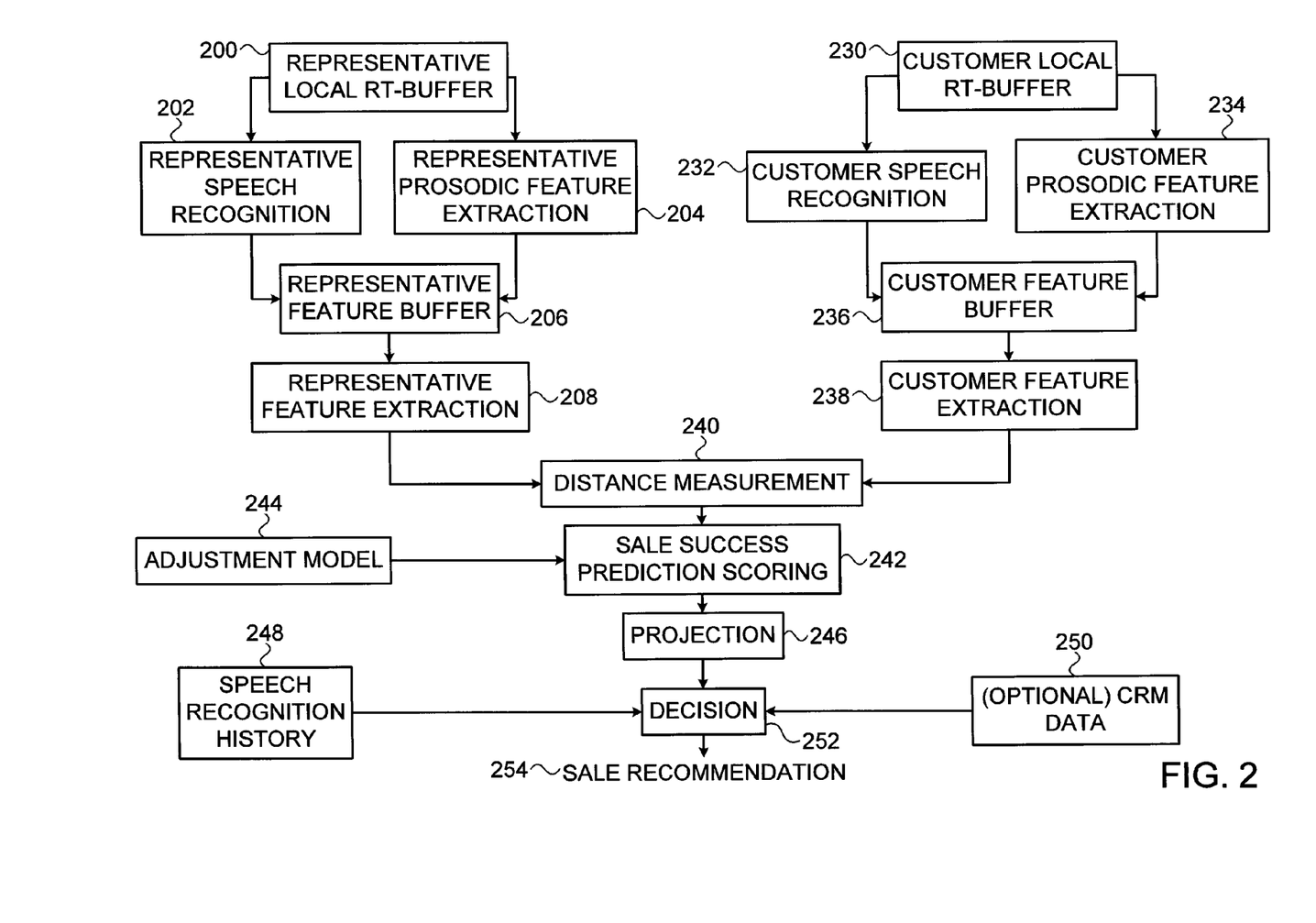
FIG. 2 is an exemplary flowchart of sale success prediction and decision according to embodiments of the disclosed subject matter.

Reference is made to FIG. 2 which shows an exemplary flow chart according to embodiments of the disclosed subject matter. The flow described herein with reference to FIG. 2 may be used to measure the distance between the customer speech characteristics and the organization representative speech characteristics, and produce a sale success prediction and a sale recommendation signal based on the distance between the two sides' speech characteristics.

Representative local RT-buffer 200 contains the representative input audio signal to the system and is a copy of the transferred content of an RT-buffer from capturing and logging component 132 of FIG. 1. Typically, a system may receive a new RT-buffer immediately upon buffer filling completion by the audio capturing and logging component 132. In other embodiments, a system may receive an RT-buffer every predefined interval. For example, providing an RT-buffer may be done each predefined interval so that the real-time aspect is maintained. In such case, an RT-buffer may be provided regardless of the amount of data it contains. For example, by providing an RT-buffer every 100 milliseconds, the system may be provided with data in substantially real-time.

Step 202 discloses applying speech recognition algorithms on the audio signal in representative local RT-buffer.

Figure 3:
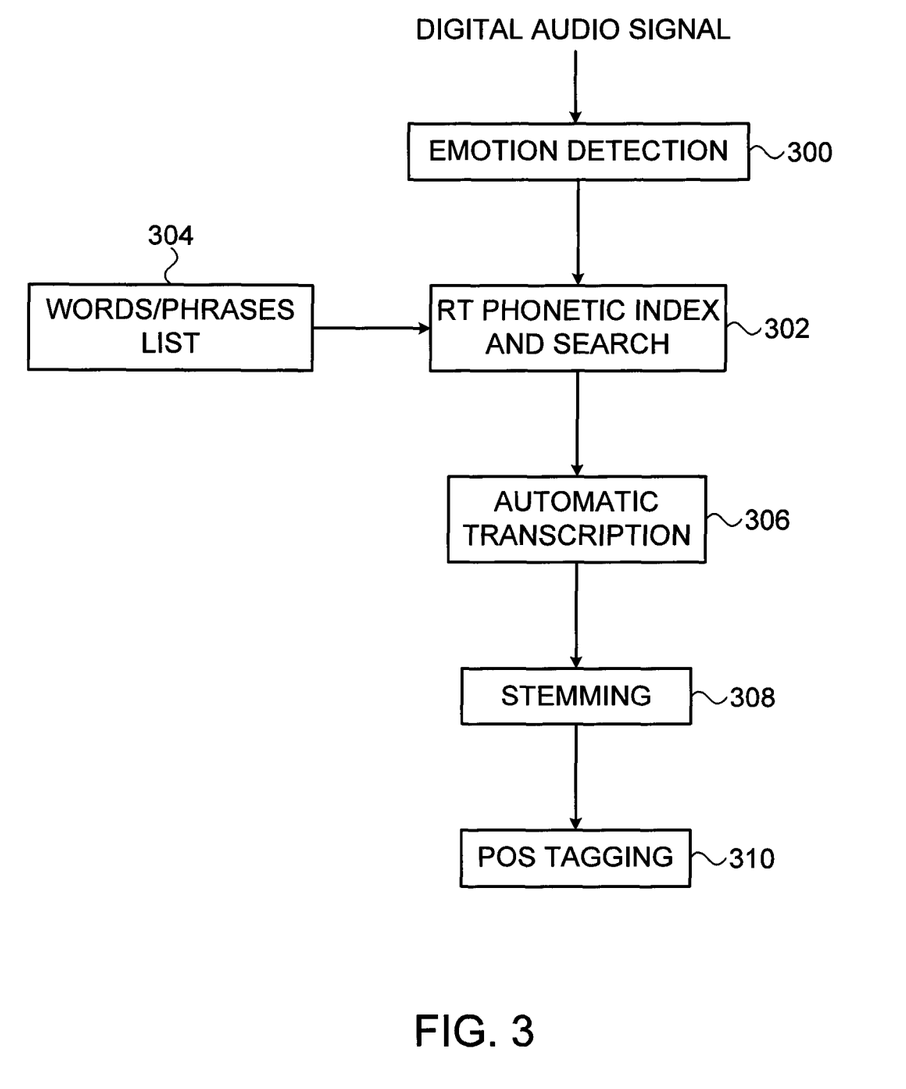
FIG. 3 is an exemplary flowchart of adjustment model generation according to embodiments of the disclosed subject matter.

Reference is now made to FIG. 3 which shows an exemplary flowchart of speech recognition step process according to embodiments of the disclosed subject matter.

Step 300 discloses applying emotion detection algorithm on the audio signal in representative local RT-buffer 200, or on the customer local RT-buffer 230. The emotion detection detects emotional events and produces an estimation of their levels and where they may be found within the audio buffer. Emotion detection may be implemented as described in the U.S. patent application Ser. No. 11/568,048 filed on Aug. 8, 2005 which is included herein by reference.

Step 302 discloses applying real time phonetic indexing and search on the audio in the representative local RT-buffer or on the audio in the customer local RT-buffer. The audio is phonetically indexed and searched according to the obtained predefined words/phrases list 304, thus producing a list of detected words and/or phrases. For each detected word a certainty level and location indication are also produced. The certainty level represents the probability that the detected word/phrase is a correct detection. The location indication indicates the distance in mili-seconds from the beginning of the audio signal.

Step 306 discloses applying automatic transcription on the audio signal in the representative local RT-buffer 200, or on the customer local RT-buffer 230 of FIG. 2, is automatically transcribed. The automatic transcription can be performed for example, by an LVCSR algorithm yielding a textual transcript that correspond a to the audio signal in the representative local RT-buffer 200 or customer local RT-buffer 230 of FIG. 2.

Step 308 discloses applying stemming algorithm on the transcribed audio. The stemming algorithm reduces inflected or derived words to their stem, base or root form, generally a written word form, for example, detecting the base form of each word, typically a singular and present form. The stem inflection is attached to each word of the transcribed audio. In some embodiments this step may be performed using proprietary tools, or any other external or commercial tools, such as LinguistxPlatform™ manufactured by Inxight.

Step 310 discloses applying Part Of Speech (POS) tagging on the transcribed audio. The POS tagging may be performed based on the definition as well as on the context of words detected in the interaction. The tags may include a verb, a noun (singular), a noun (plural), a pronoun, a preposition, an adverb, an adjective, and the like. A part of speech tag is attached to each word of the transcribed audio. In some embodiments this step may be performed using proprietary tools, or any other external or commercial tools, such as LinguistxPlatform™ manufactured by Inxight.

Reference is made back to FIG. 2; the output of the representative speech recognition step 202 may be as follows:
- Words detected along with their certainty and location
- Emotional events along with their certainty and location
- Textual transcription of the audio signal including words certainty and location
- Stemming and Part Of Speech tag to each word in the textual transcription Step 204 discloses prosodic features extraction. The prosodic features are extracted from the digital audio signal that is stored in the representative local RT-buffer. The following features may be extracted:
- Energy level
- Pitch level
- Speech rate Energy level and pitch level may typically be extracted from overlapping frames of 100 milliseconds of an audio signal. Speech rate determination may be performed based on the number of voiced sections per time frame. Speech rate may be determined by counting the number of syllables or the number of words per second. Speech rate may typically be extracted from frames of 1000 milliseconds of an audio signal.

Step 206 discloses storing the speech recognition data and the prosodic features. The speech recognition data, that is produced by the representative speech recognition step 202, and the prosodic features, that are extracted by the representative prosodic feature extraction step 204 are stored together. The representative speech recognition data and the representative prosodic features are referred to herein as the representative features. The representative features that are extracted from each real time buffer are stored, thus accumulating a sequence of extracted features from the beginning of the audio interaction until present time. Each feature is stored along with its time tag, that is, the time in milliseconds from the beginning of the interaction that the feature corresponds to.

Step 208 discloses representative feature extraction. Features are extracted based on the accumulated features stored in the representative feature buffer. The features may be extracted, from the entire data that was accumulated in the representative feature buffer, from the beginning of the interaction until present time, or from the accumulated features, from a time interval that begins in a certain point of time until present time. This time interval is referred to herein as feature frame. Typical feature frame length is 4 seconds. The extracted features on step 208 are referred to herein as the representative features.

Following is a list of features that may be extracted based on features that are stored in the representative feature buffer:
- Energy standard deviation—this feature may be extracted by calculating the energy standard deviation of the energy levels sequence across the feature buffer
- Average pitch level—this feature may be extracted by calculating the average of the pitch levels sequence across the feature buffer
- Median pitch level—this feature may be extracted by calculating the median of the pitch levels sequence across the feature buffer
- Pitch standard deviation—this feature may be extracted by calculating the standard deviation of the pitch levels sequence across the feature buffer
- Average speech rate—this feature may be extracted by calculating the average of the speech rate levels sequence across the feature buffer
- Speech rate standard deviation—this feature may be extracted by calculating the standard deviation the speech rate levels sequence across the feature buffer
- Number of emotional events
- Average level of emotional events—this feature may be extracted by calculating the average of the emotion levels of all of the emotional events across the feature buffer
- Distribution of words. This feature may be extracted, by counting the number of appearances of each word produced by the LVCSR algorithm
- Distribution of word n-grams This feature may be extracted, by counting the number of appearances of every word n-grams produced by the LVCSR algorithm
- Average sentence length—this feature may be extracted by calculating the average number of words per sentence, produced by the LVCSR algorithm, across the feature buffer
- Part Of Speech distribution—this feature may be extracted by calculating the percentage of each lexical category (part of speech category) produced by the part of speech tagger algorithm
- Percentage of filler words. Filler words are words produced in between regular dictionary words. This feature may be extracted by calculating the percentage of filler words, For example: eh, huh aha, etc., out of the total words in the transcription produced by the LVCSR algorithm Customer local RT-buffer 230 contains the customer input audio signal to the system and is a copy of the transferred content of an RT-buffer from capturing and logging component 132 of FIG. 1. Typically, a system may receive a new RT-buffer immediately upon buffer filling completion by the audio capturing and logging component 132. In other embodiments, a system may receive an RT-buffer every predefined interval. For example, providing an RT-buffer may be done each predefined interval so that the real-time aspect is maintained. In such case, an RT-buffer may be provided regardless of the amount of data it contains. For example, by providing an RT-buffer every 100 milliseconds, the system may be provided with data in substantially real-time.

Step 232 discloses applying speech recognition algorithms on the audio signal in customer local RT-buffer, similarly to the algorithms performed on step 202.

Step 234 discloses customer prosodic feature extraction. The prosodic features of the customer are extracted from the digital audio signal that is stored in the customer local RT-buffer, similarly to step 204.

Step 236 discloses accumulation and storing of customer prosodic features, similarly to step 206.

Step 238 discloses customer feature extraction. The features are extracted, similarly to step 208. The extracted features on step 238 are referred to herein as the customer features. Generally, customer speech recognition step 232, customer prosodic feature extraction step 234, customer feature buffer step 236 and customer feature extraction step 238, may be respectively similar to representative speech recognition step 202, representative prosodic feature extraction step 204, representative feature buffer step 206 and representative feature extraction step 208.

Step 240 discloses determining the distance between every representative feature and its matching customer features. The representative features are extracted on representative feature extraction step 208 and the customer features are extracted on customer feature extraction step 238

For example the distance measure between a representative feature and a customer feature may be measured by the following formula:

$$dist_{r-c} = \frac{|F_r - F_c|}{\max(F_r, F_c)}$$

Wherein $F_r$ may represent the average speech rate of the representative and $F_c$ may represent the average speech rate of the customer. $dist_{a-c}$ is a scalar and is typically in the range of 0-1, where 1 represents large distance, and 0 represents small distance between the representative average speech rate feature and the customer average speech rate feature. Assuming, for example, that the representative average speech rate, $F_r$, equals two point five words per second, and the customer average speech rate, $F_c$, equals two words per second, then the distance between the representative average speech rate and the customer average speech rate $dist_{a-c}$ may be calculated as follows:

$$dist_{r-c} = \frac{|2.5 - 2|}{\max(2.5, 2)} = 0.2$$

Similarly, the above formula may be used for distance determination between the following feature pairs:
Representative energy standard deviation; customer energy standard deviation
Representative average pitch level; customer average pitch level
Representative median pitch level; customer median pitch level
Representative pitch standard deviation; customer pitch standard deviation
Representative average speech rate; customer average speech rate
Representative speech rate standard deviation; customer speech rate standard deviation
Representative number of emotional events; customer number of emotional events
Representative average level of emotional events; customer average level of emotional events
Representative average sentence length; customer average sentence length
Representative average percent of adjective appearance; customer average percent of adjective appearance
Representative average percent of adverb appearance; customer average percent of adverb appearance
Representative percentage of filler words; customer percentage of filler words The following function may be used for the determination of the distance between the v distribution of words or word n-grams and customer distribution of words or word n-grams:

$$\text{Phrase\_dist}_{r-c} = 1 - \left| \frac{\sum_{i=1}^{N} F_i^r * F_i^c}{\sqrt{\sum_{i=1}^{N} (F_i^r)^2} * \sqrt{\sum_{i=1}^{N} (F_i^c)^2}} \right|$$

Wherein $F_i^r$ may represent the i-th word or word n-gram frequency extracted from the representative transcribed audio, and $F_i^c$ may represent the i-th word or word n-gram frequency extracted from the customer transcribed audio.

Phrase_dist$_{r-c}$ is a scalar, and is in the range of 0-1, where 1 represents large distance, and 0 represents small distance between the representative and the customer words or word n-grams distributions. Assuming, for example, that the representative frequency list of words, $F_r$, is: ["good"=3, "nice"=4, "computer"=2], and the customer frequency list of words, $F_c$ is: ["good"=2, "nice"=1, "computer"=4]. Then the distance between the representative frequency list of words and the customer frequency list of words may be calculated as follows:

$$\text{Phrase\_dist}_{a-c} = 1 - \left| \frac{3*2 + 4*1 + 2*4}{\sqrt{3^2 + 4^2 + 2^2} * \sqrt{2^2 + 1^2 + 4^2}} \right| = 0.27$$

It should be noted that in some embodiments the determination of the distance between words or word n-grams distributions may be based on other methods, such as Euclidean distance or Hamming distance.

The output of this step is a vector, where each entry of the vector is a scalar in the range 0-1 that represents the distance between one speech feature of the representative, and the same speech feature of the customer. For example the first entry may be the distance measure between the representative average speech rate and the customer average speech rate, the second entry may be the distance measure between the representative average pitch level and the customer average pitch level, and so forth. This vector is referred to herein as the distance vector.

Step 242 discloses sale success prediction scoring. The distance vector determined on step 240 is fed to a classification system as input, that is, the input to this step is a vector, where each entry of the vector is a scalar in the range 0-1 that represents the distance between one speech feature of the representative, and the same speech feature of the customer. Classification is preferably performed using methods such as Neural Networks or Support Vector Machines (SVM), For example, an SVM classifier may get the distance vector and use the adjustment model 244 that is generated on adjustment model generation step 446 of FIG. 4. The adjustment model may consist of support vectors, which are selected distance vectors that were fed to the system along with their class labels during the training phase. Binary classifier may use two classes labeled as "successful sale" and "unsuccessful sale". In this step the SVM classifier uses the support vectors that are stored in the adjustment model in order to determine the distance between the tested distance vector in its input and the support vectors stored in the model. Thus yielding a distance measure between the input vector and the "successful sale" class. This distance measure is a scalar in the range of 0-100. It is referred to herein as the sale success prediction score which is the output of this step. The sale success prediction score represents a probability estimation that a sale attempt by the representative will be successful. The sale success prediction score represents the closeness between the representative speech features and the customer speech features that are produced at steps 208 and 238. Whereas thigh score represents a small distance and a low score represents a large distance. For example, in case that the distance between the representative average speech rate feature and the customer average speech rare feature in a certain point of time of the interaction is low, the sale success prediction score may increase and hence the probability for a successful sale increases. In case that in the same point of time the distance between the representative words distribution and the customer words distribution is low than the sale success prediction score may increase even more and hence the probability for a successful sale may also increase.

Step 246 discloses determining a projection score. At projection step 246, the sale success prediction scores that were determined on step 242 are accumulated. A sale success projection score is determined based on the accumulated sale success prediction scores. The projection score aims to predict the sale success prediction score that will be produced for the next feature frame. That is predicting the similarity between the speaker's speech characteristics in the near future, typically the next five seconds. The prediction is preferably performed using methods such as Linear Predictive Coding (LPC) or other methods.

Speech recognition history 248 may include speech analytics history such as emotional events related to previous calls of the customer and specific words/phrases detected on previous calls. It may also include automatic transcription and other speech recognition data related to previous calls of the customer.

in some exemplary cases, CRM data 250 is retrieved from an external CRM system. The CRM data may include data such as: the customer's purchase history, the customer's demographic details, etc. The data may also include CRM sale success prediction and a sale recommendation. This recommendation is generated by the external CRM system based on the CRM data.

Step 252 discloses generating a decision whether to generate a sale recommendation signal or not. The decision may be based on one or more of the following parameters: the sale success prediction score, the sale success projection score, speech recognition history and CRM data. The decision is preferably performed using methods such as decision tree or other methods. For example, a sale recommendation signal will be generated based on the sale success projection score and the speech recognition history, if the sale success projection score is lower than a predefined threshold (e.g. 50) and there are no negative emotion events in the last 3 calls of the customer.

Step 254 discloses signaling a contact center representative when is the optimal time in the interaction, in terms of sale success probability, to present a sale offer to the customer. The sale recommendation signal is preferably sent in real time to the representative screen.

Figure 4:
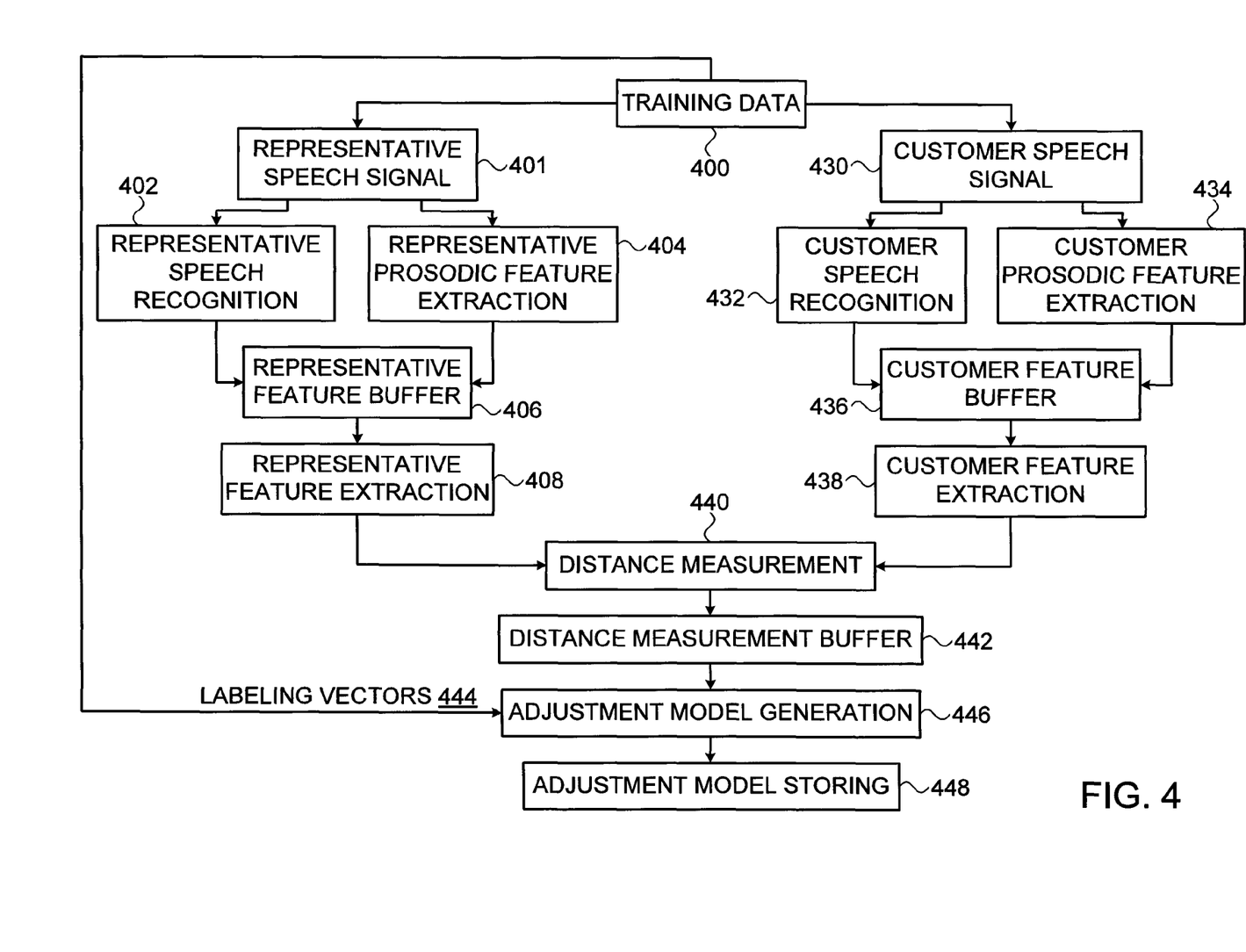
FIG. 4 is an exemplary flowchart of speech recognition according to embodiments of the disclosed subject matter.

Reference is made to FIG. 4 which shows an exemplary flowchart according to embodiments of the disclosed subject matter. The flow described herein with reference to FIG. 4 may be used to produce an adjustment model. The adjustment model is used by the sale success prediction scoring step 242 of FIG. 2 in order to produce a sale success prediction score. The sale success prediction score represents the probability for a successful sale. This score is used by the decision step 252 of FIG. 2 in order to recommend the contact center representative regarding the optimal time to introduce a sale offer to the customer.

Training data 400, may be a collection of pairs where each pair consists of a double sided audio interaction and its labeling vector. Each audio interaction consists of two audio signals, the representative speech signal side of the interaction and the customer speech signal side of the interaction. Each interaction has a unique interaction ID. A labeling vector is attached to each interaction. The interaction is framed into frames. Each frame is typically four seconds long. The labeling vector consists of a class label for each frame of the interaction. Class labels may be, for example "successful sale", "unsuccessful sale" and/or "no sale attempt". The labeling vector production may be performed manually by a labeling person. The labeling person listens to the interactions and identifies the time frame/s within the interaction where a sale attempt was introduced by the contact center representative. In addition, the labeling person identifies whether the sale attempt was successful or unsuccessful. In case that the attempt was successful, the time frame/s of the sale attempt may be labeled as "successful sale", else it may be labeled as "unsuccessful sale". Time frames within the interaction that does not contain any sale attempt may be automatically labeled as "no sale attempt". It should be noted that the labeling process may be automated by receiving the information regarding whether there was a sale or not in each interaction from a CRM system.

Representative speech signal 401 is the organization representative speech signal side of an interaction extracted from the training data 400. Customer speech signal 430 is the customer speech signal side of the same interaction extracted from the training data 400.

Representative speech signal 401 may undergo speech recognition as shown by representative speech recognition step 402 and prosodic feature extraction 404 as shown by representative prosodic feature extraction step 404. At representative feature buffer 406, the representative speech recognition output and the representative prosodic features are stored together. Generally, speech recognition step 402, representative prosodic feature extraction step 404 and representative feature buffer 406 may be respectively similar to speech recognition step 202, prosodic feature extraction step 204 and feature buffer 206 of FIG. 2.

Step 408 discloses representative feature extraction. The representative features are extracted similarly to the extraction in feature extraction step 208 of FIG. 2. A feature vector may be extracted for each time frame of the interaction. The time frame positions and durations that are used as basis for the feature vector extraction are the same time frame positions and durations of the labeling vector of the training data 400. For example, assuming time frame duration of four seconds, this step produces one feature vector for each four consecutive seconds of the interaction. That is, a feature vector for time interval (0-4) seconds, a feature vector for time interval (4.01-8) seconds and so forth.

Similarly to the representative speech signal, the customer speech signal 430 may undergo speech recognition as shown by customer speech recognition step 432, customer prosodic feature extraction 434 as shown by customer prosodic feature extraction step 434. At feature buffer 436, the customer speech recognition output and the customer prosodic features are stored together and at customer feature extraction step 438, customer features are extracted for each time frame of the interaction.

Step 440 discloses determination of distance measurement, in which the distance between every representative feature and its matching customer feature is determined producing a distance vector for each time frame, similarly to step 240 of FIG. 2.

The training process is an iterative process. Steps 402-440 are repeated iteratively. Each iteration, a different interaction, from the training data 400, is processed. The iterative process stops upon reaching a predetermined number of processed interactions or upon processing all of the interactions of the training data 400.

Step 442 discloses determination of distance measurement buffer, in which the distance vectors are accumulated and stored along with the interaction ID that is associated with the interaction that is being processed. In addition to the interaction ID, the time frame indicator within the interaction is also stored for each distance vector. For example, the buffer may be of the following structure:

{[IID=01, TF=00, DV(01,0)] [IID=01, TF=01, DV(01,1)] . . . [IID=01,TF=n, DV(01,n)] [IID=02,TF=00, DV(02,0)] . . . [IID=02, TF=m, DV(02,m)]}.

Wherein IID is the interaction ID, TF is the time frame within the interaction and DV(x,y) is the distance vector of frame y within interaction ID x.

Step 446 discloses generating an adjustment model, in which a training vector is produced by conjoining the distance measurement buffer with the labeling vectors provided in step 444 of the training data 400. The conjunction is performed by adding the associated labeling vector for each entry. For example, the training vector may be of the following structure:

{[IID=01, TF=00, DV(01,0), L(01,0)] [IID=01, TF=01, DV(01,1), LV(01,1)] . . . [IID=01,TF=n, DV(01,n), L(01,n)] [IID=02,TF=00, DV(02,0), L(02,0)] . . . [IID=02, TF=m, DV(02,m), L(02,n)]}. Whereas L(x,y) is the label of frame y within interaction ID x. Further at adjustment model generation step, a model is trained using the pair wherein each pair is DV(x,y) and L(x,y) of the training vector. Training is preferably performed using methods such as Neural Networks or Support Vector Machines (SVM). Assuming, for example, the usage of a linear classification method such as SVM. Further assuming that the classifier operates in a binary class environment—where L(x,y) belongs to one of the two classes, the "successful sale" class or the "unsuccessful sale" class. In this case the training process aims to produce a linear separation between the two classes using the DV(x,y) vectors. In the case of SVM the main training process includes the selection of DV(x,y) vectors that are close to the separation hyper plane. Those vectors are called support vectors. The output of the training process, and of this step, is a model which includes the support vectors. The model is referred to in this embodiment as the adjustment model.

Step 448 discloses adjustment model storing. The model is stored in any permanent storage, such as storage device 144 of FIG. 1. The stored model is used by the distance scoring step 242 of FIG. 2 for producing a distance score between an organization representative and a customer speech feature.

Figure 5A:
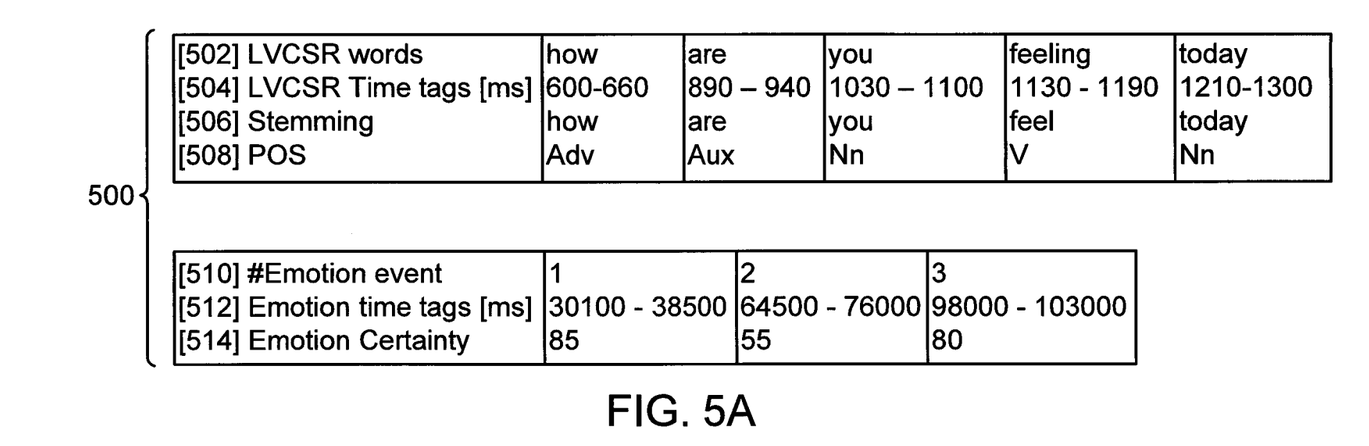
FIG. 5A is an exemplary illustration of a speech recognition data structure according to embodiments of the disclosed subject matter.

Reference is now made to FIG. 5A which shows an exemplary illustration of the speech recognition data structure 500 that may be produced by steps 202 and 232 and stored in steps 206 and 236 respectively. The speech recognition data structure may include field 502 that is a word by word transcription of the interaction produced by an LVCSR algorithm. The speech recognition data structure may include field 504 which correspond to the time tag—in milliseconds of each transcribed word of field 502. It may also include fields 506 and 508 that are the stem form and part of speech tag of the words in field 502. The speech recognition data structure may also include an emotion event enumeration field 510. It may also include emotion event information such as emotion time tags field 512 and emotion certainty field 514.

Figure 5B:
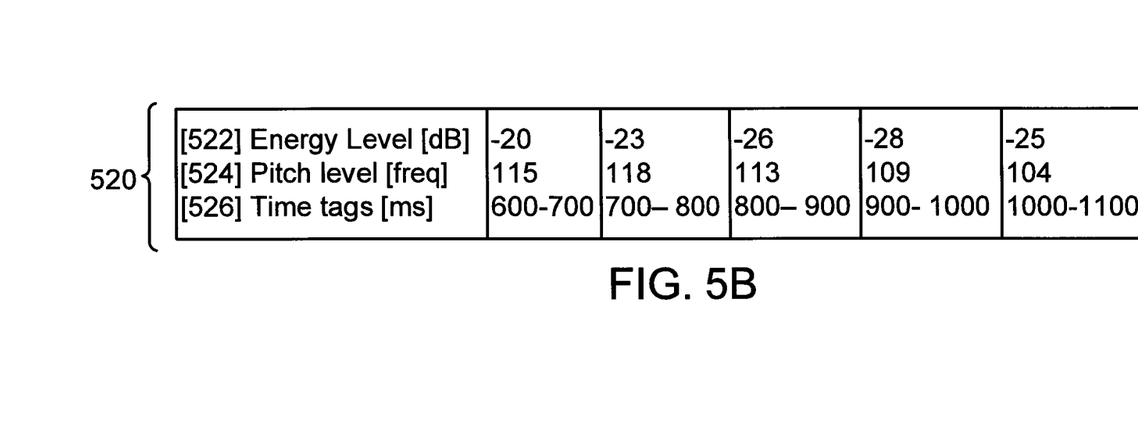
FIG. 5B is an exemplary illustration of a prosodic features data structure according to embodiments of the disclosed subject matter.

Reference is now made to FIG. 5B which shows an exemplary illustration of the prosodic features data structure 520 that may be produced by steps 204 and 234 and stored in steps 206 and 236 respectively. Prosodic features data structure may include field 522 that is the energy level in dB, field 524 that is the pitch level in Hertz, and field 526 which is the time tag—in milliseconds that corresponds to the energy and pitch levels.

Figure 6:
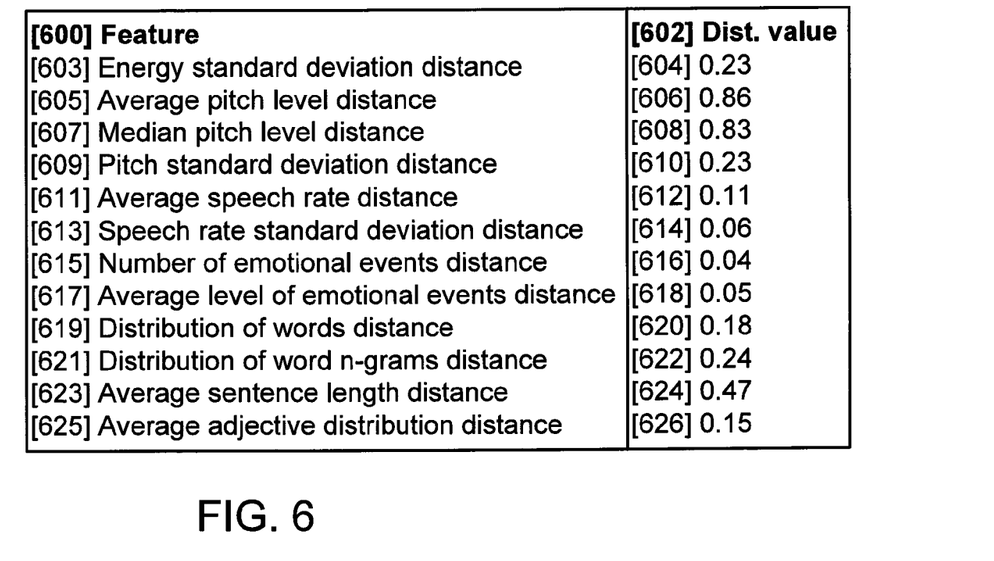
FIG. 6 is an exemplary illustration of a distance vector data structure according to embodiments of the disclosed subject matter.

Reference is now made to FIG. 6 which shows an exemplary illustration of the distance vector data structure that may be produced by the distance measurement step 240 of FIG. 2, similarly it may be produced by the distance measurement step 440 of FIG. 4. The distance vector is used as input to the sale success prediction scoring step 242 of FIG. 2 and is also used as input to the distance measurement buffer step 442 of FIG. 4. Each one of the fields 604, 606, 608 . . . 626 of the distance vector is a scalar in the range 0-1 that represents the distance between one speech feature of the representative, and the same speech feature of the customer as illustrated by fields 603, 605 . . . 625.

Figure 7:
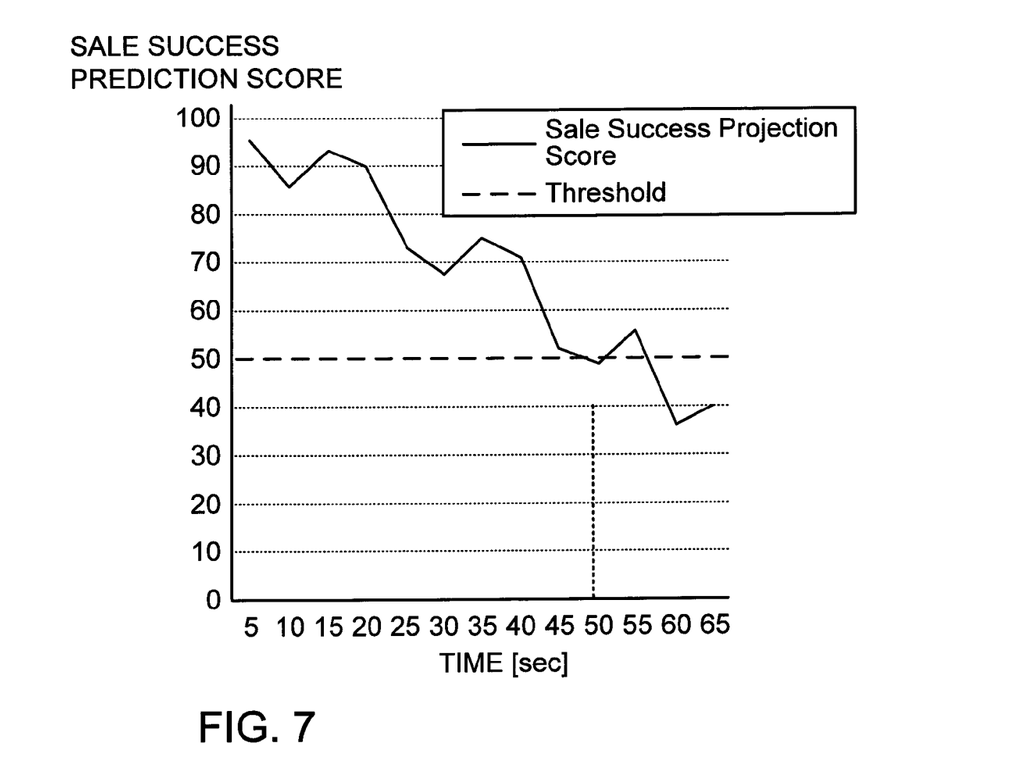
FIG. 7 is an exemplary graphical illustration of a sale success projection score over time according to embodiments of the disclosed subject matter.

Reference is now made to FIG. 7 which shows an exemplary illustration graph of the sale success projection score over time. Five seconds from the beginning of the interaction, the sale success projection score value is 100. Fifty seconds from the beginning of the interaction the sale success projection score goes down, for the first time in the interaction, below the predefined threshold. In some embodiments, were the decision depends solely on the sale success projection score, crossing the predefined threshold triggers a sale recommendation signal.

Figure 8:
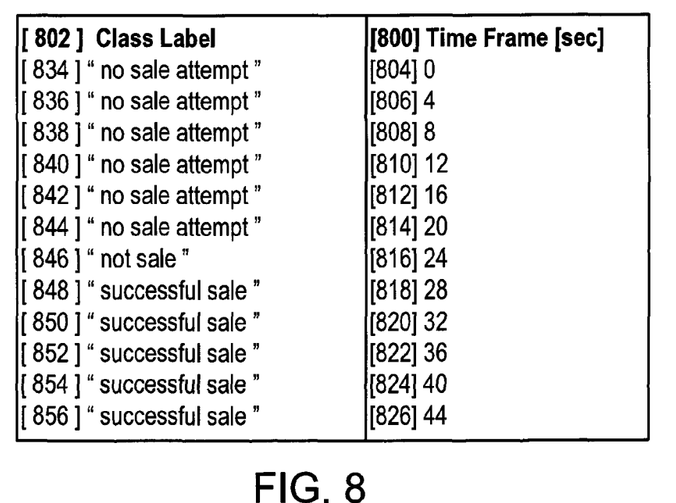
FIG. 8 is an exemplary illustration related to a labeling vector associated with an interaction according to embodiments of the disclosed subject matter.

Reference is now made to FIG. 8 which shows an exemplary illustration of the labeling vector that may be associated with an interaction that is part of the training data corpus 400, of FIG. 4. Fields 804-826 may be the time indicators of each time frame. Each time indicator is set to be the time, in seconds, from the beginning of the interaction to its associated frame. Fields 834-856 may be the associated class labels of each time frame. For example, fields 834-846 indicate that there is no sale attempt during the first 28 seconds of the interaction. Fields 848-856 indicate that there is a successful sale attempt between second 28 and 44.

Figure 9:
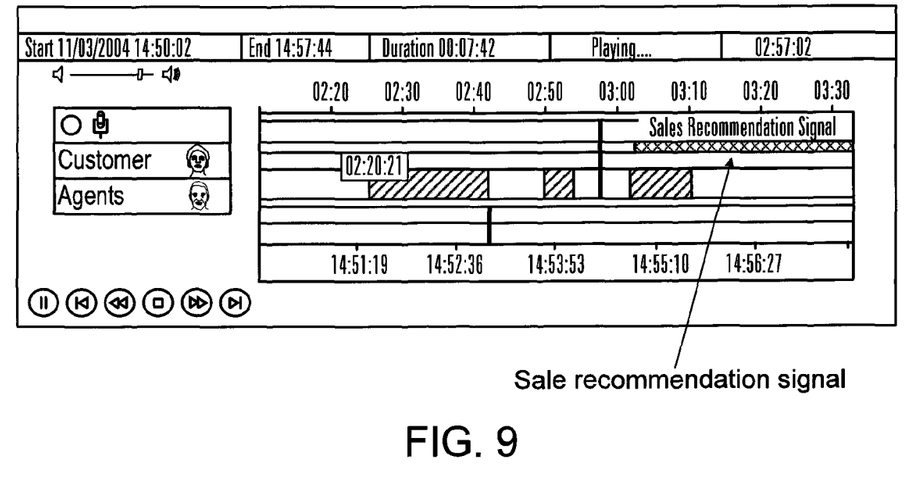
FIG. 9 is an exemplary visualization of an interaction record and a sale recommendation signal according to embodiments of the disclosed subject matter.

Reference is now made to FIG. 9 which shows an exemplary visualization of an interaction record and a sale recommendation signal according to embodiments of the disclosed subject matter.

What is claimed is:

1. A computerized method for sales optimization comprising:

receiving at a general purpose computer serving as a computer server a digital representation of a portion of an interaction between a customer and an organization representative, the portion of an interaction comprises a speech signal of the customer and a speech signal of the organization representative;

analyzing the speech signal of the organization representative;

analyzing the speech signal of the customer;

determining by the computer server a distance vector between the speech signal of the organization representative and the speech signal of the customer; and predicting a sale success probability score for the captured speech signal portion.

2. The method according to claim 1, further comprises applying a statistical model to the distance vector.

3. The method according to claim 2, wherein said statistical model is created from distance vectors generated from features extracted from a group of interactions with a determination if there was a successful sale or not at each portion of each interaction.

4. The method according to claim 1, analyzing, the speech signal of the customer comprises extracting prosodic features of the speech signal of the customer.

5. The method according to claim 1, analyzing the speech signal of the organization representative comprises extracting prosodic features of the speech signal of the organization representative.

6. The method according to claim 1, wherein analyzing the speech signal of the customer comprises performing speech recognition of the speech signal of the customer.

7. The method according to claim 1, wherein analyzing the speech signal of the organization representative comprises performing speech recognition of the speech signal of the organization representative.

8. The method according to claim 1, wherein the method is performed while the interaction is in progress.

9. The method according to claim 1 further comprising: storing the sale success probability score; predicting a second sale success probability score for the next portion of the interaction using the stored sale success probability scores.

10. The method according to claim 1, further comprises issuing a sale recommendation signal based on the sale success probability score.

11. The method according to claim 10, wherein the said sale recommendation signal is issued based on the second sale success probability score and/or speech recognition history and/or CRM data.

12. The method according to claim 1, wherein analyzing the speech signal of the customer comprises automatically transcribing, the speech signal of the customer.

13. The method according to claim 1, wherein analyzing the speech signal of the customer comprises automatically detecting keywords in the speech signal of the customer.

14. The method according to claim 1, wherein analyzing the speech signal of the customer comprises automatically detecting emotions in the speech signal of the customer.

15. The method according to claim 1, wherein analyzing the speech signal of the organization representative comprises automatically transcribing the speech signal of the organization representative.

16. The method according to claim 1, wherein analyzing the speech signal of the organization representative comprises automatically detecting keywords in the speech signal of the organization representative.

17. The method according to claim 1, wherein analyzing the speech signal of the organization representative comprises automatically detecting emotions in the speech signal of the organization representative.

\* \* \* \* \*